Figure 1:
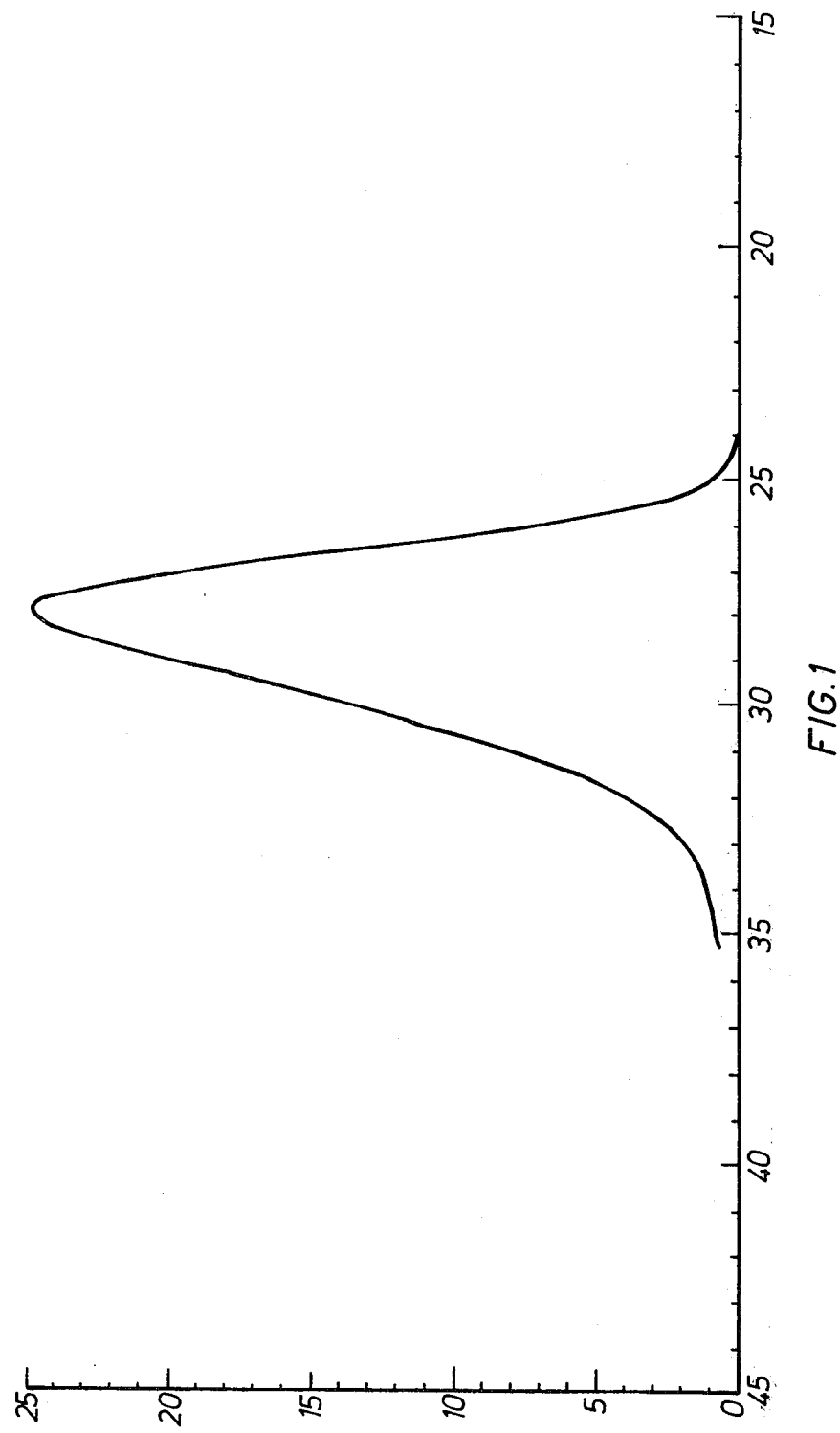

United States Patent [19]

Keggenhoff et al.

[11] 4,141,806

[45] Feb. 27, 1979

[54] BULK PHOTO POLYMERIZATION PROCESS FOR ESTERS OF ACRYLIC AND METHACRYLIC ACIDS

[75] Inventors: Berthold Keggenhoff; Hans J. Rosenkranz; Hans Rudolph, all of Krefeld, Fed. Rep. of Germany

[73] Assignee: Bayer Aktiengesellschaft, Fed. Rep. of Germany

[21] Appl. No.: 756,060

[22] Filed: Jan. 3, 1977

[30] Foreign Application Priority Data

Jan. 7, 1976 [DE] Fed. Rep. of Germany ....... 2600318

[51] Int. Cl.$^2$ .............................................. C08F 2/46
[52] U.S. Cl. .......................... 204/159.22; 204/159.23; 204/159.24; 526/272; 526/273; 526/303; 526/312; 526/317; 526/320
[58] Field of Search ...................... 204/159.22, 159.23, 204/159.24

[56] References Cited

U.S. PATENT DOCUMENTS

| | | | |
|---|---|---|---|
| 3,666,645 | 5/1972 | Ronsohoff | 204/159.22 |
| 3,753,958 | 8/1973 | Wingler et al. | 260/78.5 R |
| 3,879,357 | 4/1975 | Wingler et al. | 260/80.8 |
| 3,929,602 | 12/1975 | Kaetsu et al. | 204/159.22 |

FOREIGN PATENT DOCUMENTS 1310729  3/1973  United Kingdom.
1332247 10/1973  United Kingdom.

*Primary Examiner*—Richard B. Turer
*Attorney, Agent, or Firm*—Connolly and Hutz

[57] ABSTRACT

Ethylenically unsaturated monomers are polymerized in bulk in the presence of from 0 to 10% by weight of a photoinitiator by irradiation of UV light
(a) in a first reaction stage at or below the boiling point of the reaction mixture, up to a conversion of 40 – 80% by weight, and
(b) in a second reaction stage, at a temperature which has been raised by from 20 to 120° C. and is above the glass transition temperature of the resulting polymer, up to a conversion of above 90% by weight, the percentages in each case relating to the total amount of monomer.

4 Claims, 2 Drawing Figures

BULK PHOTO POLYMERIZATION PROCESS FOR ESTERS OF ACRYLIC AND METHACRYLIC ACIDS

The subject of the present invention is a process for the photoinitiated bulk polymerisation of ethylenically unsaturated monomers.

The photoinitiated polymerisation of ethylenically unsaturated monomers is one of the oldest polymerisation processes and is frequently employed for the investigation of polymerisation mechanisms. In such polymerisation experiments, the reaction is in general discontinued after a conversion of a few per cent. An investigation of the behaviour at high conversion has only rarely been carried out. The use of photopolymerisation has extended almost exclusively to photocrosslinking systems, such as photoprint plates and photocuring lacquer systems (compare H. Barzinsky, Chem. Ztg. 1972, page 545). The only industrially utilised photopolymerisations of non-crosslinked systems which are taken to high conversions are confined to aqueous solutions of water-soluble monomers DT-AS No. 2,050,988 and German Offenlegungsschrift No. 2,009,748. The particular advantages of photopolymerisation in the bulk polymerisation of ethylenically unsaturated monomers taken to high polymer conversions have hitherto hardly been utilised in industrial practice.

The polymerisation of ethylenically unsaturated monomers is in general effected with the aid of radical initiators, in most cases peroxidic radical initiators, which decompose thermally. Of the processes of polymerisation in bulk, solution, emulsion and suspension, the bulk polymerisation process is distinguished by the purity of the products obtained, and their economical manufacture. Disadvantages are the high exothermicity, the difficulties in removing the heat of reaction from the generally very viscous reaction mixture, and frequently a very broad molecular weight distribution of the products obtained. The greatest problem in the thermally initiated bulk polymerisation is the thermal control of the reaction system: since the activation energy is about 30 kcal/mol, an inadequate removal of the heat of reaction can lead to explosively accelerated polymerisation and to destruction of the polymerisation apparatus. Even if only slight temperature fluctuations occur, polymers with a very broad molecular weight distribution and with inadequate use properties are frequently produced. Finally, the initiators themselves, which in most cases are peroxidic in nature, represent, because of their ability to explode, a source of danger in storage and handling. Because of this difficult controllability, and danger, the industrial application of bulk polymerisation has remained limited.

DT-OS (German Offenlegungsschriften) Nos. 1,965,740 and 2,304,847 describe a process for the thermally initiated bulk polymerisation of monomer mixtures containing acrylic esters, which is characterised in that the reaction mixture is polymerised, in a first stage, in the presence of a radical initiator which decomposes below 100° C., and the resulting 60–70% strength polymer syrup is mixed with a second radical initiator, which decomposes above 100° C., and is finally polymerised, to conversions above 90%, at a higher temperature.

According to the disclosures of the abovementioned Offenlegungsschriften, the bulk polymerisation of acrylic esters cannot be taken to conversions of above 90% of a single thermally decomposing radical initiator is used. This is because if only one initiator, which decomposes at a low temperature, is used, the polymerisation only continues very slowly above 60–70% conversion and finally comes to a stop. The isolation of the pure polymer then requires expensive removal of the considerable residual amount of monomer, which is generally effected by evaporation.

On the other hand, the exclusive use of an initiator which decomposes at a high temperature leads particularly easily to an uncontrollable course of the reaction, since major amounts of unconsumed initiator accumulate in the polymerising mixture and then initiate an explosive reaction if there is a local rise in temperature.

Admittedly it is possible, by using two initiators, to polymerise acrylic esters to the desired high conversions. However, adding initiator twice requires additional metering equipment and is prone to faults. Furthermore, an amount of peroxide of 1–2% is required to achieve sufficiently high yields. This detracts from the purity of the polymers obtained. Finally, even this thermally initiated bulk polymerisation has the disadvantage that the molecular weight distribution is broadened.

Surprisingly, it has now been found that numerous monomers and monomer mixtures, especially those which contain esters of acrylic acid and methacrylic acid, can be polymerised to conversions of above 90% by weight of photoinitiated bulk polymerisation, with a single addition of less than 10% by weight, in most cases less than 0.5%, especially 0.1–0.3% by weight, of a photoinitiator, if the monomer mixture containing the photoinitiator and, if appropriate, further auxiliaries such as molecular weight regulators or stabilisers, is polymerised to 40–80% by weight conversion in a first stage, suitably at or below the boiling point of the mixture, by irradiation with UV light, the temperature is than raised, in a second stage, by 20–120° C., so that the glass transition temperature Tg of the resulting polymer is exceeded, and polymerisation is carried out, by further UV irradiation, to above 90% by weight conversion.

The temperature of the reaction mixture in the first stage can be chosen within a wide range, below its boiling point, in accordance with the polymerisation behaviour of the monomers. In the case of relatively low-boiling monomers, the polymerisation in the first stage can be carried out, for example, at or, if appropriate, even below room temperature. In general, the temperature in the first reaction stage can be 70–80° C. or more below the boiling point of the reaction mixture. In many cases, a reaction temperature of 50–100° C. has proved appropriate.

It is furthermore surprising that the polymers manufactured in accordance with this process possess molecular weight distributions which are comparatively narrow and above all completely follow a uniform pattern, and which frequently correspond to the so-called Schulz-Flory formal distribution. Such molecular weight distributions with a uniform pattern are only achieved rarely in the case of the previously known, thermally initiated bulk polymerisations.

The process furthermore has the advantage of a relatively low activation energy of the polymerisation, which is about 4 kcal/mol. This makes the reaction thermally easily controllable and virtually excludes too vigorous a course due to adventitious temperature fluctuations of the system. The bulk polymerisation process according to the invention is therefore relatively safe and can easily be handled industrially, particularly since the storage and handling of the photoinitiators also present no problems. Furthermore, if desired, the rate of polymerisation can be controlled in a simple manner by varying the intensity of the UV light with which the mixture is irradiated.

The present invention provides a process for the bulk polymerisation of ethylenically unsaturated monomers, comprising polymerisation of the monomer in the presence of from 0 to 10% by weight of a photoinitiator by irradiation with UV light
(a) in a first reaction stage at or below the boiling point of the reaction mixture, up to a conversion of 40–80% by weight, and
(b) in a second reaction stage, at a temperature which has been raised by from 20 to 120° C. and is above the glass transition temperature of the resulting polymer, up to a conversion of above 90% by weight, the percentages in each case relating to the total amount of monomer.

The process of the present invention is advantageously applied to a monomer mixture which comprises esters of acrylic acid and methacrylic acid with aliphatic alcohols.

A particularly valuable process of the present invention comprises polymerisation of a monomer mixture of the following composition:
(A) 25–95 parts by weight of one or more $C_1$–$C_8$-alkyl esters of acrylic acid and methacrylic acid.
(B) 0–70 parts by weight of styrene, or styrene substituted in the side chain or in the nucleus by $C_1$–$C_4$-alkyl groups, halogen atoms or nitro groups.
(C) 5–50 parts by weight of one or more unsaturated monomers which contain functional groups, above all carboxyl, sulphonate, phosphonate, amino, ammonium, amide, methylol, hydroxyl, epoxy, mercaptan, anhydride or isocyanate groups.
(D) 0–20 parts by weight of further copolymerisable monomers, not mentioned under A–C.

Copolymers produced by this process can be used, if appropriate after admixture of pigments and suitable crosslinking agents, that is to say substances which react with the functional groups of the monomers (C) to produce crosslinking, as lacquers for lacquering of, for example, domestic equipment, automotive components and machine components, or other metal articles. For this purpose they can be applied, dissolved in suitable solvents, by brushing or spraying, or can also be applied solvent-free in accordance with the methods of fluidised bed sintering or flame sintering, or the electrostatic powder spraying process.

Given a suitable choice of monomers, the polymers can also be used as binding components in polymer blends, for example polyamide/polyolefine blends or polystyrene/polycarbonate blends.

In a further aspect the present invention provides a polymer when obtained by process of the present invention.

Suitable ethylenically unsaturated monomers with which the process according to the invention can be carried out are, for example, aliphatic, cycloaliphatic, aromatic and heterocyclic olefines and vinyl compounds, as well as their halogen derivatives and nitro derivatives, unsaturated alcohols, their ethers, esters and thioethers, as well as the corresponding sulphoxides and sulphones, unsaturated ketones, aldehydes and amines, unsaturated carboxylic acids, their amides, nitriles, anhydrides, esters and chlorides, vinyl-substituted inorganic acids and their derivatives, conjugated and non-conjugated dienes and polyenes, and other unsaturated compounds with olefinic double bonds, as well as mixtures of the said monomers.

The following may be mentioned individually as monomers which are polymerisable according to the invention: ethylene, trichloroethylene, tetrafluoroethylene, tetrachloroethylene, trifluorochloroethylene, vinyl chloride, vinylidene chloride, nitroethylene, vinyl bromide, propylene, trichloropropene, isobutylene, butadiene, 2-chlorobutadiene, isoprene, 2,3-dimethylbutadiene, vinylacetylene, divinylacetylene, ethyl vinyl ether, isobutyl vinyl ether, ketene diethylacetal, acrolein, methyl vinyl ketone, dimethyl Ketene, methyl isopropenyl ketone, vinyl acetate, vinyl stearate, vinyl benzoate, allyl alcohol, allylamine, diallylamine, dialkyldiallylammonium compounds, allyl chloride, allyl acetate, methallyl alcohol, methallyl chloride, methallyl acetate, acrylic acid, methacrylic acid, acrylic acid esters and methacrylic acid esters, for example methyl, ethyl, propyl, butyl and hexyl esters or esters of optionally N-substituted aminoalcohols, acrylamide and methacrylamide as well as their alkylamino derivatives, acrylonitrile and methacrylonitrile, crotonic acid and its derivatives, fumaric acid dinitrile, fumaryl chloride, fumaric acid monoesters and diesters, maleic anhydride, maleic acid dinitrile, maleic acid chloride, maleic acid monoesters and diesters, itaconic acid and its derivatives, α-cyanosorbic acid n-butyl ester, vinylsulphonic acid, N,N-dimethylvinylamine, vinyl isocyanate, N-vinylcarbamic acid esters, N-vinylureas, cyclopentadiene, styrene, chlorostyrene, bromostyrene, α-methylstyrene, nitrostyrene, styrenesulphonic acid, 4-methylene-1,3-dioxolane, methyl vinyl sulphide, methyl vinyl sulphone, N-vinyl-α-pyrrolidone, N-vinylsuccinimide, 2-vinylnaphthalene, vinylpyridine, vinyl-substituted Schiff's bases, N-vinylcarbazole, trimethylvinylsilane, vinylphosphonic acid and its esters.

The following may be listed as examples of monomers which are contained in the particularly preferred monomer mixtures:

Group (A)

Methyl acrylate, ethyl acrylate, propyl acrylate, butyl acrylate, isobutyl acrylate, amyl acrylate, hexyl acrylate, methyl methacrylate, ethyl methacrylate, propyl methacrylate, butyl methacrylate, isobutyl methacrylate, amyl methacrylate and hexyl methacrylate.

Group (B)

Styrene, α-methylstyrene, chlorostyrene, bromostyrene and nitrostyrene.

Group (C)

Acrylic acid, methacrylic acid, crotonic acid, fumaric acid and its half-esters, maleic acid and its half-esters, itaconic acid, vinylsulphonic acid, styrenesulphonic acid, vinylphosphonic acid, allylamine, diallylamine, N,N-dialkylaminoethyl acrylate and methacrylate with $C_1$–$C_5$-alkyl radicals, N,N,N-trialkylammonium ethylacrylate and methacrylate with $C_1$–$C_5$-alkyl radicals, acrylamide, methacrylamide, N-methylolacrylamide and N-methylolmethacrylamide, allyl alcohol, hydroxyethyl acrylate and methacrylate, hydroxypropyl acrylate and methacrylate, glycidyl acrylate and methacrylate, maleic anhydride and vinyl isocyanate.

Group (D)

Ethylene, propylene, isobutylene, butadiene, isoprene, dimethylbutadiene, chloroprene, vinyl chloride, vinyl acetate, vinyl propionate, $C_1$-$C_8$-dialkyl esters of fumaric acid and maleic acid, acrylonitrile and methacrylonitrile.

The polymerisation recipes can furthermore contain customary additives, such as stabilisers and flameproofing agents and regulators, such as mercaptans or halogen compounds. Regarding the drawing up of polymerisation recipes for the bulk polymerisation of ethylenically unsaturated monomers, see also Houben-Weyl, Methoden der Organischen Chemie (Methods of Organic Chemistry), volume 14-1.

In contrast to the customary processes, the initiation of the polymerisation is effected, in the process according to the invention, by irradiation with light. This can be carried out without photoinitiators or, preferably, with photoinitiators in amounts of 0.001 to 10% by weight of the amount of monomer; 0.05-0.5% of photoinitiator are employed particularly preferentially.

Photoinitiators in the sense of the invention are all substances which, under the influence of light of suitable wavelength, produce radicals or ions which in turn are capable of initiating polymerisation reactions.

Examples of suitable photoinitiators are benzoin and benzoin derivatives of the general formula I

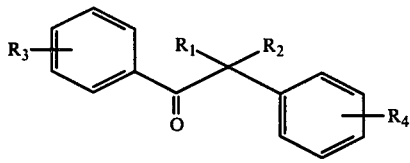

wherein
$R_1$ denotes —O—Y or —S—Y and
Y denotes hydrogen, trimethylsilyl, $C_1$-$C_{18}$-alkyl, $C_6$-$C_{15}$-aryl or $C_7$-$C_{15}$-aralkyl,
$R_2$ denotes hydrogen, $C_1$-$C_{18}$-alkyl, $C_6$-$C_{15}$-aryl, $C_7$-$C_{15}$-aralkyl, carboxyl or $CH_2$—O—R′ and R′ is hydrogen or the acid radical of a carboxylic acid or of a sulphonic acid and
$R_3$ and $R_4$ denote hydrogen, $C_1$-$C_4$-alkyl, halogen, such as F, Cl, Br and I or —O—R″ and
R″ denotes $C_1$-$C_{18}$-alkyl;
and benzophenone and benzophenone derivatives of the general formula II

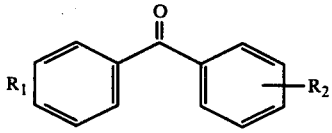

wherein
$R_1$ denotes $CH_2$—X, CH—$X_2$ or $CX_3$,
$R_2$ denotes H, $CH_3$, $CH_2$—X, CH—$X_2$ or $CX_3$ and
X denotes chlorine, bromine or iodine.

It is equally possible to use the other photoinitiators known from the literature, such as aromatic sulphochlorides, phenacyl bromide, aromatic disulphodes or anthraquinone derivatives.

Further examples of such suitable initiators are described in German Offenlegungsschriften Nos. 1,769,168, 1,769,853, 1,769,854, 1,807,297, 1,807,301, 1,919,678 and 1,949,010, as well as in DT-AS (German Published Specification) No. 1,694,149 (compare also J. Kosar, "Light-Sensitive Systems", Wiley-Verlag, New York, 1965).

The following benzoin derivatives, acetophenones and benzophenones are particularly suitable photoinitiators: benzoin methyl ether, ethyl ether, sec.-butyl ether, n-propyl ether, isopropyl ether, butyl ether, isobutyl ether and phenyl ether, α-methylbenzoin methyl ether, α-phenylbenzoin ethyl ether, α-phenylbenzoin methyl ether, α-allylbenzoin ethyl ether, α-benzyl benzoin ethyl ether, α-hydroxymethylbenzoin, α-hydroxymethylbenzoin isopropyl ether, α-acetoxymethylbenzoin isopropyl ether, 4-benzoyl-4-phenyl-1,3-dioxolane, α-(β-cyanoethyl)-benzoin ethyl ether and α-(β-carboxyethyl)-benzoin and its ethyl ether; α-(β-carboxyethyl)-benzoin alkyl ethers and their salts; benzoin trimethylsilyl ether, α-methylbenzoin trimethylsilyl ether, α-ethylbenzoin trimethylsilyl ether, α-phenylbenzoin trimethylsilyl ether, 4,4′-dimethylbenzoin trimethylsilyl ether, 4,4′-dimethoxybenzoin trimethylsilyl ether as well as sulphonic acid esters of α-hydroxymethylbenzoin, and also α-phenylthio-α-phenylacetophenone, α-phenylthio-acetophenone, α-n-butylthio-α-phenylacetophenone and benzophenones such as p-benzoylbenzyl chloride, p-benzoylbenzal chloride, p-benzoylbenzotrichloride, p-benzoylbenzyl bromide, p-benzoylbenzal bromide, p-benzoylbenzotribromide, 4,4′-bis-chloromethylbenzophenone, 4,4′-bis-dichloromethylbenzophenone, 4,4′-bis-trichloromethylbenzophenone, 4,4′-bis-bromomethylbenzophenol, 4,4′-bis-dibromomethylbenzophenone, 4,4′-bis-dibromomethylenzophenone, 4,4′-bis-tribromomethylbenzophenone and o-benzoylbenzotrichloride. Mixtures of these compounds can also be used.

The process can be carried out in various ways, and in particular both discontinuously and continuously. It is also possible to carry out one process stage continuously and the other discontinuously.

The first stage is suitably carried out in stirred vessels with heating and cooling equipment. For this, the lamps used for irradiation are built into the reaction vessels, as immersed lamps, or surround the reaction vessel from the outside, as a ring of lamps; in the latter case, the reaction vessel suitably consists of glass, quartz or some other material which transmits the UV light used.

In the continuous method, which is preferred, the monomer mixture, which contains the photoinitiator and, if appropriate, further additives, is fed into the reaction vessel as a constant stream and at the same time a corresponding amount of partially polymerised mixture is expelled from the reactor and transferred to the second stage.

In carrying out the second stage of the process, the high viscosity of the completely converted reaction mixture must particularly be taken into account. On a laboratory scale, for example, the process is carried out in dishes which are heated from the bottom face whilst they are irradiated with light from the top face, which is closed with a glass lid. On an industrial scale, especially in continuous operation, special mixers or extruders with an external glass wall can be used, so that the light which initiates the polymerisation can be radiated into the apparatus from outside. It is, however, also possible to use apparatuses such as are described in DT-AS No. 2,050,988 and German Offenlegungsschrift No. 2,009,748 that is to say the prepolymer can be spread, in a sufficiently thin layer, on heated flow belts and be finally polymerised on these by irradiation.

Light sources which can be used in both stages of the process according to the invention are mercury vapour lamps, fluorescent tubes, xenon lamps, carbon arc lamps or other lamps which emit light of a suitable wavelength. It is preferred to use so-called superactinic fluorescent tubes, which have a radiation maximum at a wavelength of 360 nm.

The use examples which follow demonstrate the process according to the invention for photoinitiated bulk polymerisation, in various experimental embodiments.

The percentage data are always % by weight.

The molecular heterogeneity $H_n$ is defined as follows:

$$H_n = (Mw/Mn - 1$$

(Mw = weight average molecular weight
Mn = number-average molecular weight).

EXAMPLE 1

A reaction mixture of 480 g of styrene, 390 g of butyl acrylate, 130 g of acrylic acid, 15 g of t-dodecylmercaptan and 1 g of benzoin isopropyl ether is exposed to light in a thermostatically controlled vessel having an immersed lamp (fluorescent tube of 6 W, radiation maximum 360 mn) at 73° C. for 7¼ hours. The polymer conversion in this first stage is 65.5%. The mixture is then filled into a dish closed with a glass lid and is exposed to light from a similar fluorescent tube, whilst being heated to 135° C. The polymerisation is taken to a conversion of 93.5%. The gel chromatography of the polymer in tetrahydrofurane gives a molecular weight distribution corresponding to the Schulz-Flory distribution (see FIG. 1)

In FIG. 1, the relative concentration (ordinate axis) is shown in relation to the molecular weight (abscissa axis). The molecular weight is here quoted indirectly in so-called counts, which correspond to the individual fractions.

The relation between the elution volume or the fractions obtained on gel chromatography and given, in FIG. 1, in counts, to the molecular weight is determined by prior calibration with polystyrene.

For example, in FIG. 1 the following correspond:

| Count | 24 | 26 | 27 | 28 | 29 | 30 |
|---|---|---|---|---|---|---|
| Molecular weight | 110,000 | 70,000 | 44,000 | 26,500 | 16,000 | 10,000 |

The weight average molecular weight $M_w$ is 23,900 and the heterogeneity $H_n$ is 1.21.

The polymer has an acid number of 110.

In contrast thereto, a polymer of the same composition manufactured in accordance with the instructions of DOS (German Published Specification) No. 1,304,847 has a heterogeneity $H_n$ of 1.94 and a non-uniform molecular weight distribution which exhibits subsidiary maxima.

EXAMPLE 2

A reaction mixture of 900 g of methyl methacrylate, 100 g of methacrylic acid, 20 g of t-dodecylmercaptan and 2 g of benzoin isopropyl ether is polymerised analogously to Example 1.

First stage: temperature 83° C., illumination time 2 hours, conversion 43.6%.

Second stage: temperature 105° C., illumination time 2 hours, conversion 96.1%.

EXAMPLE 3

A reaction mixture of 600 g of methyl methacrylate, 300 g of butyl acrylate, 100 g of hydroxypropyl methacrylate, 12 g of t-dodecylmercaptan and 1 g of benzoin isopropyl ether is polymerised analogously to Example 1.

First stage: temperature 90° C., illumination time 1½ hours, conversion 59.9%.

Second stage: temperature 120° C., illumination time 2 hours, conversion 94.4%.

EXAMPLE 4

A reaction mixture of 450 g of styrene, 400 g of butyl acrylate, 150 g of glycidyl methacrylate, 10 g of t-dodecylmercaptan and 3 g of benzoin isopropyl ether is polymerised analogously to Example 1.

First stage: temperature 82° C., illumination time 10 hours, conversion 74.1%.

Second stage: temperature 120° C., illumination time 2 hours, conversion 95.4%.

EXAMPLE 5

A reaction mixture of 400 g of methyl methacrylate, 500 g of butyl acrylate, 50 g of maleic anhydride, 10 g of t-dodecylmercaptan and 2 g of benzoin isopropyl ether is polymerised analogously to Example 1.

First stage: temperature 87° C., illumination time 105 minutes, conversion 63.0%.

Second stage: temperature 121° C., illumination time 120 minutes, conversion 96.3%.

EXAMPLE 6

A reaction mixture of 600 g of methyl methacrylate, 300 g of butyl acrylate, 50 g of acrylic acid, 50 g of acrylamide 20 g of t-dodecylmercaptan and 0.5 g of benzoin isopropyl ether is polymerised analogously to Example 1.

First stage: temperature 98° C., illumination time 75 minutes, conversion 71.0%.

Second stage: temperature 121° C., illumination time 120 minutes, conversion 92.8%.

EXAMPLE 7

A reaction mixture of 400 g of methyl methacrylate, 400 g of ethyl acrylate, 200 g of N,N-dimethylaminoethyl methacrylate, 15 g of t-dodecylmercaptan and 1 g of benzoin isopropyl ether is polymerised analogously to Example 1.

First stage: temperature 84° C., illumination time 2 hours 10 minutes, conversion 64.3%.

Second stage: temperature 120° C., illumination time 2 hours, conversion 96.6%.

EXAMPLE 8

A reaction mixture of 1,200 g of styrene, 975 g of butyl acrylate, 325 g of acrylic acid, 37.5 g of t-dodecylmercaptan and 2.5 g of benzoin isopropyl ether is illuminated for 4 hours at 80° C. in a stirred glass vessel equipped with internal heating and three symmetrically externally mounted fluorescent tubes (each 40 W, radiation maximum 360 nm). The polymer conversion in this first stage is 62%. The batch is then heated to 130° C. in the same vessel and illuminated for a further 1½ hours. The final conversion is 91.2%.

The molecular weight distribution, determined by gel chromatography in tetrahydrofurane, corresponds to the Schulz-Flory distribution, the weight average molecular weight $M_w$ is 17,600 and the heterogeneity $H_n$ is 1.03.

EXAMPLE 9

A reaction mixture of 1,050 g of styrene, 637.5 g of butyl acrylate, 825 g of hydroxyethyl methacrylate, 26.3 g of acrylic acid, 75 g of t-dodecylmercaptan and 7.5 g of benzoin isopropyl ether is illuminated in the same stirred vessel as in Example 8, for 3½ hours at 82° C., by means of four symmetrically externally mounted fluorescent tubes (each 25 W, radiation maximum 360 nm). The polymer conversion in this first stage is 73.1%. The temperature is then raised to 120° C., and the mixture is illuminated for a further 95 minutes. The final conversion is 96.5%.

The molecular weight distribution, determined by gel chromatography in tetrahydrofurane corresponds to the Schulz-Flory distribution. The weight average molecular weight $M_w$ is 14,950 and the heterogeneity $H_n$ is 1.04.

The polymer has an OH number of 130.

EXAMPLE 10

A reaction mixture of 5,760 g of styrene, 4,440 g of butyl acrylate, 1,800 g of acrylic acid, 180 g of t-dodecylmercaptan and 12 g of benzoin isopropyl ether is photopolymerised continuously.

Figure 2:
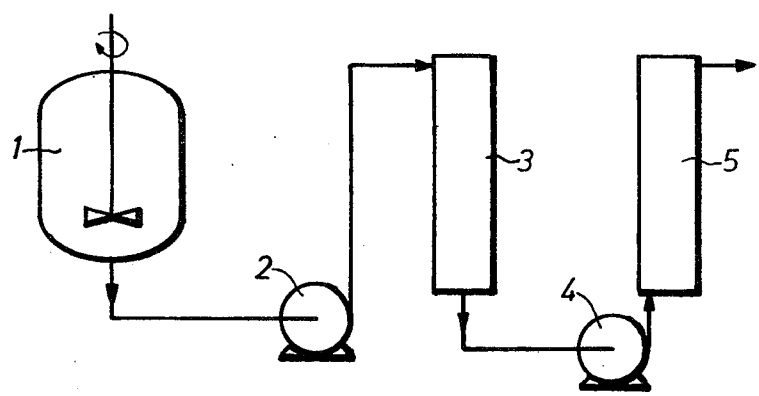

Two stirred glass vessels (3), (5) (shown in FIG. 2) each of about 3 l capacity, with heating and externally mounted fluorescent tubes, are used for the polymerisation. Vessel (3) is temperature-controlled to 80° C. and vessel (5) to 140° C. A total of 10 fluorescent tubes (radiation maximum 360 nm) having a total wattage of 470 W are arranged conjointly around both vessels. The reaction mixture is fed from the stock tank (1) in a constant stream, by means of the pump (2), into the vessel (3), and after passing through the latter is passed on by the pump (4) into the vessel (5), from where it leaves as the end product (see FIG. 2).

The throughput is 1.27 kg/hour, the polymer conversion on leaving vessel (3) is 48.0% and the final conversion is 92.3% on leaving vessel 5.

The molecular weight distribution determined by gel chromatography in tetrahydrofurane corresponds to the Schulz-Flory distribution. The weight average molecular weight $M_w$ is 19,400 and the heterogeneity $H_n$ is 1.02. The polymer has an acid number of 110.

EXAMPLE 11

A reaction mixture of 4,800 g of methyl methacrylate, 2,400 g of styrene, 3,600 g of butyl acrylate, 1,200 g of glycidyl methacrylate, 240 g of t-dodecylmercaptan and 24 g of benzoin isopropyl ether is polymerised continuously as in Example 10.

Throughput: 1.29 kg/hour
Temperature in vessel (3): 80° C.
Temperature in vessel (5): 145° C.
Conversion at outlet of vessel (3): 53.5%
Conversion at outlet of vessel (5): 94.1%.

The molecular weight distribution (determined in THF) shows no subsidiary maxima.

Weight average $M_w$ 35,000
Heterogeneity $H_n$ 1.37.

What we claim is:

1. A process for the bulk polymerization of a monomer composition containing at least one ester selected from the group consisting of esters of acrylic acid and esters of methacrylic acid, said process comprising polymerizing the monomer composition in the presence of from 0 to 10% by weight of a photo initiator by irradiation with UV light.
   (a) in a first reaction stage at a temperature at or below the boiling point of the reaction mixture up to a conversion of 40 to 80% by weight based on total monomer, and
   (b) in a second reaction stage at a temperature which is from 20 to 120° C. above the temperature of the first reaction stage and which is also above the transition temperature of the resulting polymer up to a conversion of more than 90% by weight, based on total monomer.

2. A process as claimed in claim 1, wherein a mixture of the following composition is polymerized:
   (A) from 25 to 95 parts by weight of one or more $C_1$ to $C_8$-alkyl esters of acrylic acid and/or methacrylic acid,
   (B) from 0 to 70 parts by weight of styrene and/or styrene which is substituted in the side chain or in the nucleus by $C_1$ to $C_4$-alkyl groups, halogen atoms or nitro groups,
   (C) from 5 to 50 parts by weight of one or more unsaturated monomers which contain carboxyl, sulphonate, phosphonate, amino, ammonium, amide, methylol, hydroxyl, epoxy, mercaptan, anhydride or isocyanate groups as functional groups, and
   (D) from 0 to 20 parts by weight of a further copolymerisable monomer.

3. A process as claimed in claim 1 wherein the photo-initiator is benzoin or a substituted benzoin compound of the formula (I)

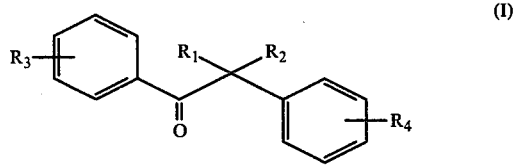

(I)

wherein
$R_1$ denotes —O—Y or —S—Y and
Y denotes hydrogen, trimethylsilyl, $C_1$ to $C_{18}$-alkyl, $C_6$ to $C_{15}$-aryl or $C_7$ to $C_{15}$-araryl;
$R_2$ denotes hydrogen, $C_1$ to $C_{18}$-alkyl, $C_6$ to $C_{15}$-aryl, $C_7$ to $C_{15}$-aralkyl, carboxyl or $CH_2$—O—R' and R' is hydrogen or the acid radical or a carboxylic acid or of a sulphonic acid; and
$R_3$ and $R_4$ each denote hydrogen, $C_1$ to $C_4$-alkyl, halogen, or —O—R" and
R" denotes $C_1$ to $C_{18}$-alkyl.

4. A process as claimed in claim 1 wherein the photo-initiator is benzophenone or a substituted benzophenone compound of the general formula (II)

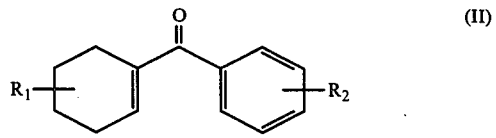

(II)

wherein
$R_1$ denotes $CH_2$—X, CH—$X_2$ or $CX_3$;
$R_2$ denotes H, $CH_3$, $CH_2$—X, CH—$X_2$ or $CX_3$; and
X denotes chlorine, bromine or iodine.

* * * * *